United States Patent
Masui et al.

(10) Patent No.: US 10,350,999 B2
(45) Date of Patent: Jul. 16, 2019

(54) VEHICLE CRUISE CONTROL APPARATUS AND VEHICLE CRUISE CONTROL METHOD

(71) Applicants: DENSO CORPORATION, Kariya, Aichi-pref. (JP); TOYOTA JIDOSHA KABUSHIKI KAISHA, Toyota-shi, Aichi-ken (JP)

(72) Inventors: Youhei Masui, Kariya (JP); Toyoharu Katsukura, Kariya (JP); Yoshihisa Ogata, Kariya (JP); Takeshi Nanami, Toyota (JP); Takashi Nishida, Toyota (JP)

(73) Assignees: DENSO CORPORATION, Kariya, Aichi-pref. (JP); TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/529,915

(22) PCT Filed: Oct. 5, 2015

(86) PCT No.: PCT/JP2015/078154
§ 371 (c)(1),
(2) Date: May 25, 2017

(87) PCT Pub. No.: WO2016/084479
PCT Pub. Date: Jun. 2, 2016

(65) Prior Publication Data
US 2017/0326981 A1    Nov. 16, 2017

(30) Foreign Application Priority Data

Nov. 28, 2014 (JP) ................. 2014-242235

(51) Int. Cl.
*G06K 9/00* (2006.01)
*G08G 1/16* (2006.01)
(Continued)

(52) U.S. Cl.
CPC .......... *B60K 31/0008* (2013.01); *G01S 13/86* (2013.01); *G01S 13/867* (2013.01);
(Continued)

(58) Field of Classification Search
CPC ...... G01S 13/86; G01S 13/867; G01S 13/931; G08G 1/166; G08G 1/167; G06K 9/00791
(Continued)

(56) References Cited

U.S. PATENT DOCUMENTS 6,853,906 B1    2/2005   Michi et al.

FOREIGN PATENT DOCUMENTS

JP    2002-211270      7/2002
JP    2002-211270 A    7/2002
(Continued)

*Primary Examiner* — Maceeh Anwari
(74) *Attorney, Agent, or Firm* — Knobbe, Martens, Olsen & Bear, LLP

(57) ABSTRACT

A cruise control apparatus, mounted to a vehicle, controls traveling of the own vehicle, based on a predicted course, which is a future course of the own vehicle. The cruise control apparatus includes a preceding vehicle position storage unit, a course prediction computation unit, and a cancellation determination section. The preceding vehicle position storage unit chronologically stores a preceding vehicle position, which is a position of a preceding vehicle traveling ahead of the own vehicle. The predicted course computation unit calculates a predicted course, based on the trajectory of the preceding vehicle position. The cancellation determination section cancels the preceding vehicle position stored in the preceding vehicle position storage unit when it
(Continued)

has been determined that either the own vehicle or the preceding vehicle is in a situation where the own vehicle or the preceding vehicle is likely to depart from the current course.

10 Claims, 5 Drawing Sheets

(51) Int. Cl.
  *B60K 31/00* (2006.01)
  *G01S 13/86* (2006.01)
  *G01S 13/93* (2006.01)
(52) U.S. Cl.
  CPC ........ *G01S 13/931* (2013.01); *G06K 9/00791* (2013.01); *G08G 1/166* (2013.01); *G08G 1/167* (2013.01); *B60T 2201/02* (2013.01); *B60T 2260/09* (2013.01); *G01S 2013/935* (2013.01); *G01S 2013/9321* (2013.01); *G01S 2013/9346* (2013.01); *G01S 2013/9353* (2013.01); *G01S 2013/9375* (2013.01)

(58) Field of Classification Search
  USPC .......................................................... 701/93
  See application file for complete search history.

(56) References Cited

FOREIGN PATENT DOCUMENTS

| | | | | |
|---|---|---|---|---|
| JP | 2002211270 | A | * | 7/2002 |
| JP | 2002-531886 | A | | 9/2002 |
| JP | 2004-078333 | | | 3/2004 |
| JP | 2004-078333 | A | | 3/2004 |
| JP | 2004078333 | A | * | 3/2004 |
| JP | 2008-276689 | | | 11/2008 |
| JP | 2008-276689 | A | | 11/2008 |
| JP | 2008276689 | A | * | 11/2008 |

* cited by examiner

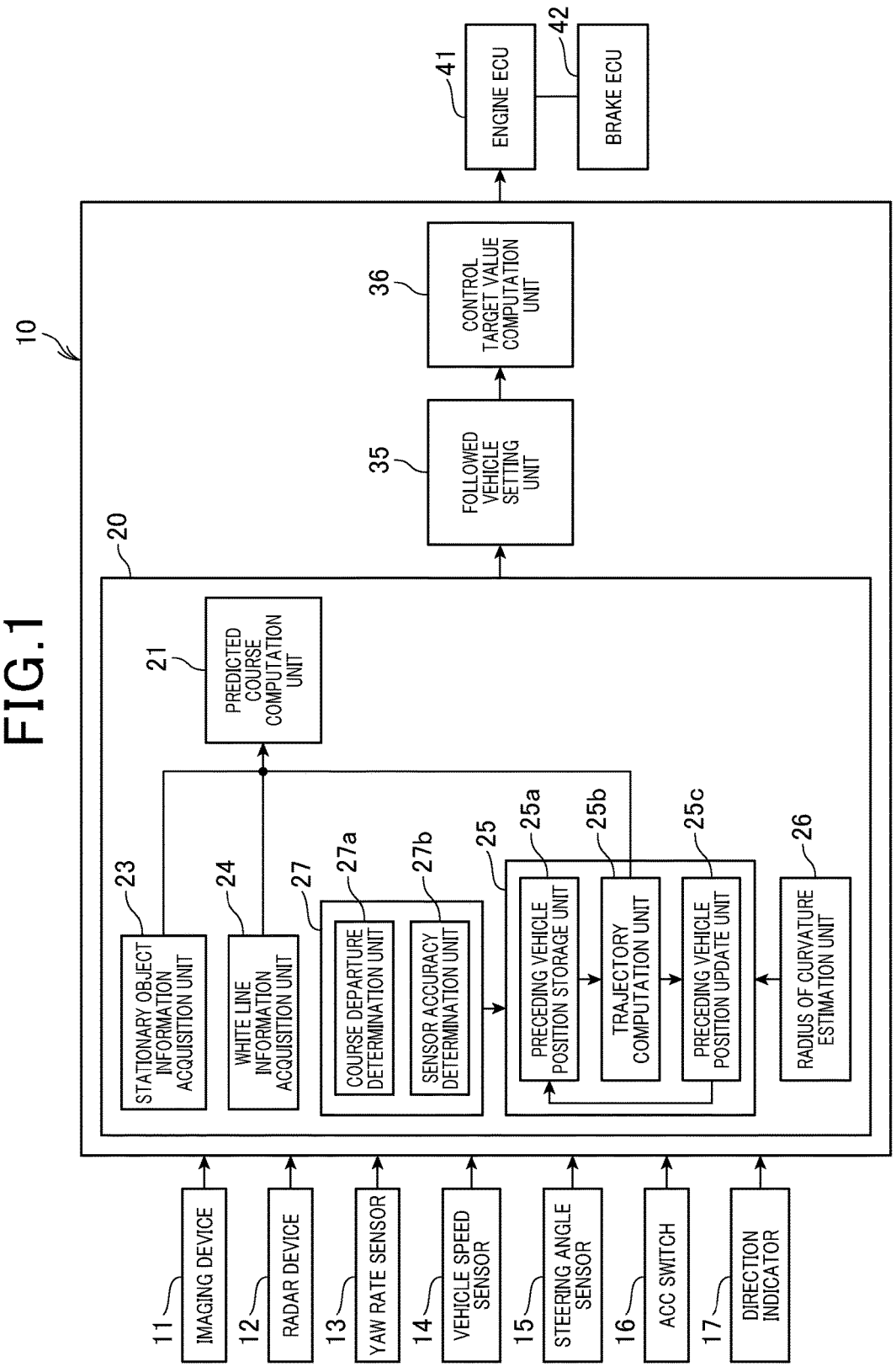

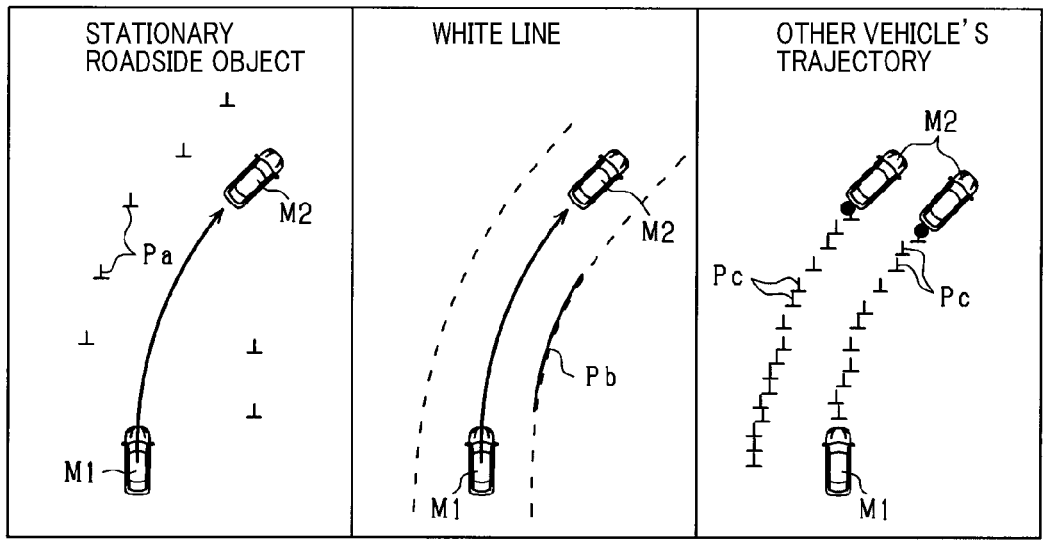
FIG. 2A  FIG. 2B  FIG. 2C
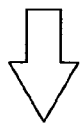
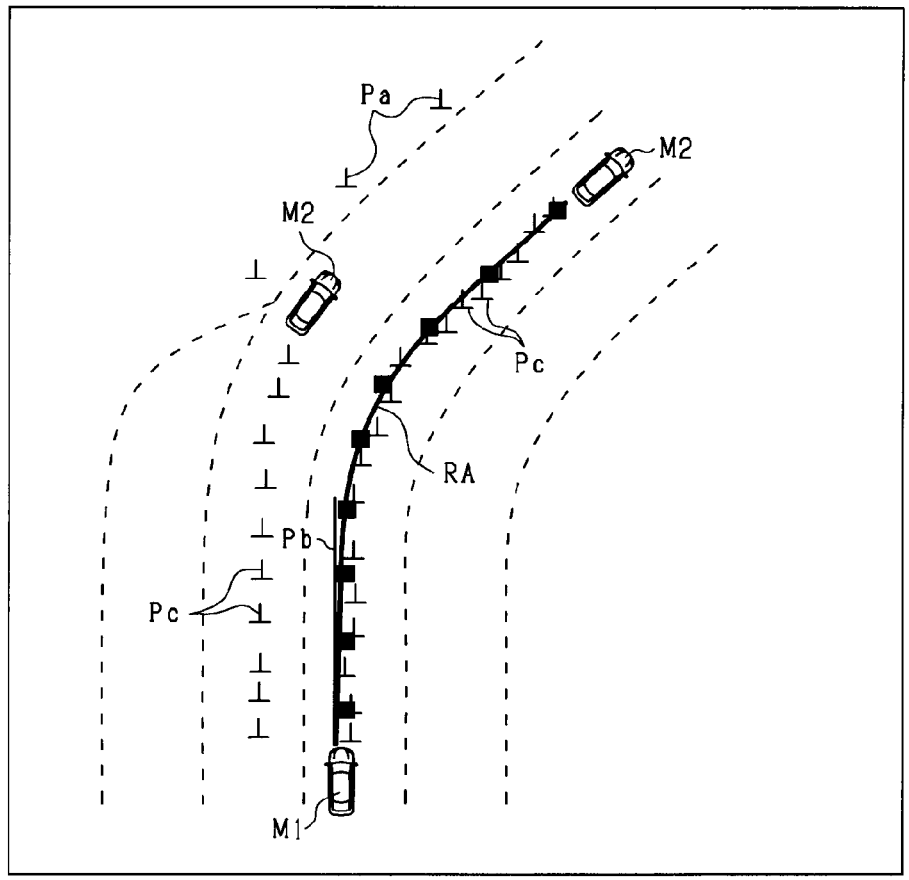
FIG. 2D

VEHICLE CRUISE CONTROL APPARATUS AND VEHICLE CRUISE CONTROL METHOD

CROSS-REFERENCE TO RELATED APPLICATION

This application is based on and claims the benefit of priority from earlier Japanese Patent Application No. 2014-242235 filed on Nov. 28, 2014 the descriptions of which is incorporated herein by reference.

TECHNICAL FIELD

The present disclosure relates to a vehicle cruise control technique of controlling traveling of the own vehicle, based on a predicted course of the own vehicle.

BACKGROUND ART

A vehicle-following control, which is a known vehicle cruise-assist control, causes the own vehicle to follow a preceding vehicle that travels on the same lane as the own vehicle among preceding vehicles traveling ahead of the own vehicle. In such vehicle-following control, for example, it is important that a vehicle traveling on the same lane as the own vehicle is identified with high accuracy among the preceding vehicles detected by, for example, a sensor or a camera. For this reason, a preceding vehicle present on a computed future course of the own vehicle is conventionally used as a target of the vehicle-following control. There are various methods of calculating a future course of the own vehicle (see, for example, PTL 1). The method disclosed in PTL 1 involves storing the trajectory of a vehicle traveling ahead of the own vehicle and, based on the stored trajectory, calculating a future course of the own vehicle.

CITATION LIST

Patent Literature

[PTL 1] JP 2002-531886 T

SUMMARY OF THE INVENTION

Technical Problem

According to the invention disclosed in PTL 1, the shape of the road is estimated based on the trajectory of a preceding vehicle present on the same lane as the own vehicle when the own vehicle is following the preceding vehicle, and the result of this estimation is used as a future course of the own vehicle. The technique of PTL 1 does not consider the case in which the own vehicle or the preceding vehicle makes a course change, in which case a wrong course may be computed as a predicted course of the own vehicle.

An object of this disclosure is to provide a vehicle cruise control technique that prevents accuracy in predicting the course of the own vehicle from decreasing.

Solution to Problem

This disclosure employs the following means.

This disclosure relates to a vehicle cruise control apparatus that controls traveling of the own vehicle, based on a predicted course of the own vehicle, that is, a future course of the own vehicle. The cruise control apparatus of this disclosure includes a position storage means for chronologically storing the preceding vehicle position, which is the position of a preceding vehicle traveling ahead of the own vehicle, and a course calculation means for calculating a predicted course of the own vehicle, based on the trajectory of the preceding vehicle positions stored in the position storage means. The cruise control apparatus further includes a cancellation means for determining whether either the own vehicle or the preceding vehicle is in a situation where the own vehicle or the preceding vehicle is likely to depart from the current course, and canceling the preceding vehicle positions stored in the position storage means when it has been determined that either the own vehicle or the preceding vehicle is in the situation where the own vehicle or the preceding vehicle is likely to depart from the current course.

During actual driving, a driver of each vehicle may change the current course by making a right or left turn or by making a lane change, possibly resulting in a situation inappropriate to the calculation of the trajectory of the preceding vehicle. In such cases, the prediction may fail to provide a highly accurate result, leading to low controllability of driving assistance.

In view of this, the cruise control apparatus of this disclosure is configured to cancel the preceding vehicle positions indicating the trajectory of a preceding vehicle when it has been determined that either the own vehicle or the preceding vehicle is in a situation where the own vehicle or the preceding vehicle is likely to depart from the current course. When the course of the own vehicle is predicted using the data obtained in a situation where either the own vehicle or the preceding vehicle has departed from the current course, that is, has not moved along the lane or the road, accuracy in the prediction may decrease. According to the above configuration, the cruise control apparatus of this disclosure prevents accuracy in predicting the course of the own vehicle from decreasing.

The cruise control apparatus of this disclosure includes a position storage means for chronologically storing a value of the preceding vehicle position, which is the position of a preceding vehicle traveling ahead of the own vehicle, and a course calculation means for calculating a predicted course of the own vehicle, based on the trajectory of the preceding vehicle positions stored chronologically in the position storage means. The cruise control apparatus further includes a position update means for updating, as the previous value, each value of the preceding vehicle positions stored chronologically in the position storage means every time the trajectory of the preceding vehicle is calculated. The position update means performs coordinate transformation of the preceding vehicle positions stored chronologically in the position storage means, based on the speed and yaw rate of the own vehicle, and the values of the preceding vehicle positions subjected to the coordinate transformation are each updated as the previous value.

During actual driving, other than a straight road and a road with gentle curves, a vehicle may travel on a road with complicated curves such as an S-shaped curve. On such a road with complicated curves, accuracy in calculating the trajectory of a preceding vehicle may decrease. In that case, the prediction may fail to provide a highly accurate result, lowering controllability of driving assistance.

In view of this, the cruise control apparatus of this disclosure is configured to perform coordinate transformation of the preceding vehicle positions on a time-series basis, based on the speed and yaw rate of the own vehicle, and to update, as the previous value, each value of the preceding vehicle positions subjected to the coordinate transformation.

This configuration enables the determination of the position of the preceding vehicle relative to (i.e., with reference to) the position of the own vehicle at a point in time during traveling of the own vehicle, thus allowing the trajectory of the preceding vehicle to be calculated more accurately when the own vehicle is turning. Consequently, the course of the own vehicle can be predicted more appropriately.

BRIEF DESCRIPTION OF THE DRAWINGS

FIG. 1 is a block diagram illustrating a schematic configuration of a vehicle cruise control apparatus.

FIG. 2A illustrates a plurality of stationary object detected points.

FIG. 2B illustrates white line information.

FIG. 2C illustrates a record of a plurality of vehicle detected points.

FIG. 2D illustrates a predicted course that has been calculated using the stationary object detected points, white line information, and vehicle detected points.

DESCRIPTION OF THE EMBODIMENTS

Figure 3:
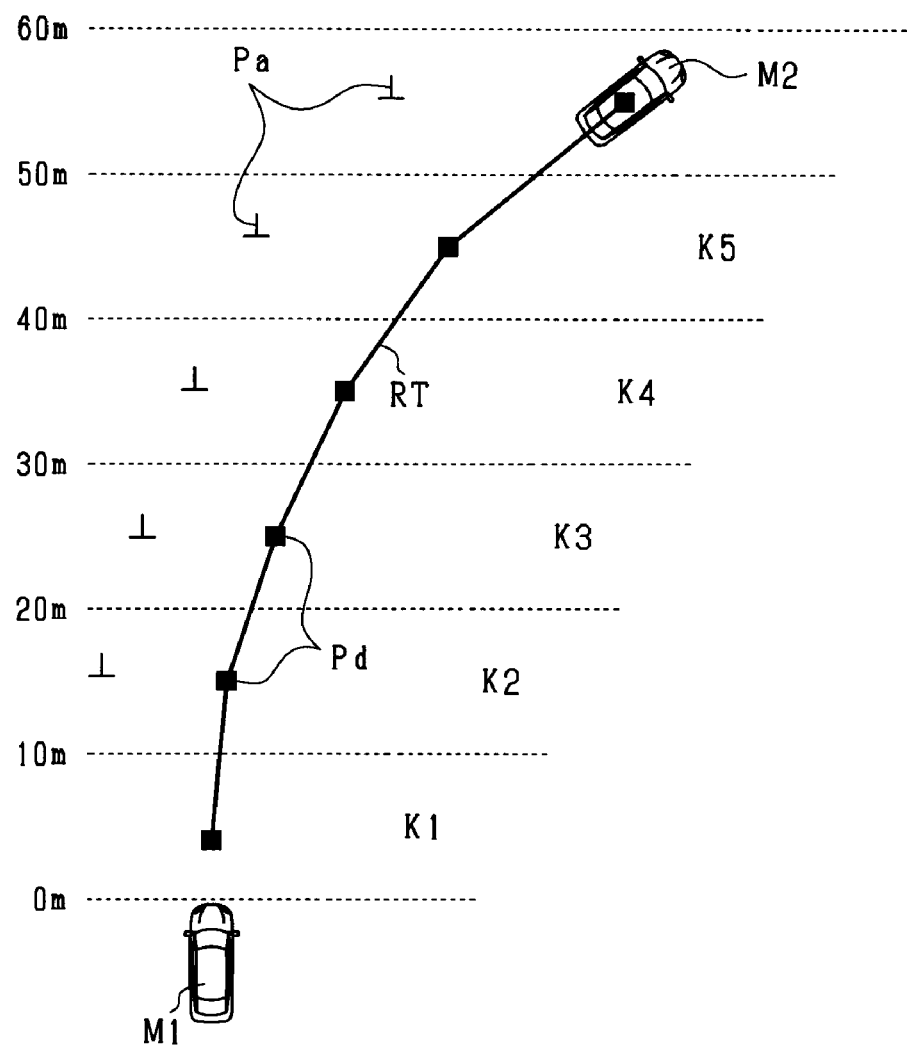
FIG. 3 illustrates the position and trajectory of a preceding vehicle.

An embodiment of a vehicle cruise control apparatus will now be described with reference to the drawings. The cruise control apparatus according to the present embodiment is mounted to a vehicle. The cruise control apparatus performs vehicle-following control to cause the own vehicle to follow a preceding vehicle that travels on the same lane as the own vehicle among preceding vehicles traveling ahead of the own vehicle. The vehicle-following control controls a following distance between the own vehicle and the preceding vehicle. With reference to FIG. 1, a schematic configuration of the cruise control apparatus of the present embodiment will now be described.

A cruise control apparatus 10 of FIG. 1 is a computer including a CPU, ROM, RAM, and I/O. The cruise control apparatus 10 includes a course prediction section 20, followed vehicle setting unit 35, and control target value computation unit 36. The CPU executes a program installed in the ROM, to implement these functions. The vehicle (the own vehicle) includes an object detection means for detecting an object present around the vehicle. The cruise control apparatus 10 receives information on a detected object from the object detection means, and performs vehicle-following control to cause the own vehicle to follow the preceding vehicle, based on the input information. The own vehicle includes an imaging device 11 and a radar device 12, each serving as the object detection means.

The imaging device 11 is a vehicle-mounted camera, and includes a CCD camera, CMOS image sensor, and near-infrared camera. The imaging device 11 captures an image of a surrounding environment including the road on which the own vehicle is traveling, generates image data representing the captured image, and sequentially outputs the data to the cruise control apparatus 10. The imaging device 11, which may be installed near the upper side of the windshield of the own vehicle, captures a region that extends ahead of the own vehicle at a predetermined angle of $\theta 1$ from the imaging axis of the imaging device 11, with the imaging axis used as the center of the region. The imaging device 11 may be a monocular camera or a stereo camera.

The radar device 12 is a detection device that transmits electromagnetic waves as transmitted waves (survey waves) and detects an object upon receiving the reflected wave. The radar device 12 of the present embodiment is a millimeter wave radar. Using radar signals, the radar device 12, mounted to the front of the own vehicle, scans a region that extends ahead of the vehicle at a predetermined angle of $\theta 2$ ($\theta 2 < \theta 1$) from the optical axis of the radar device 12, with the optical axis used as the center of the region. The radar device 12 then creates distance measurement data, based on the time required for the electromagnetic waves, which have been transmitted in the forward direction of the vehicle, to return to the radar device 12, and sequentially outputs the created distance measurement data to the cruise control apparatus 10. The distance measurement data contains information on the direction in which the object is present, the distance from the own vehicle to the object, and the relative velocity between the own vehicle and the object. The radar device 12 corresponds to "the following distance sensor".

In the vehicle ready for shipment, the imaging device 11 and radar device 12 are mounted thereto such that the imaging axis, which is a reference axis, of the imaging device 11 and the optical axis, which is a reference axis, of the radar device 12 run parallel to a road surface on which the own vehicle travel. Detection ranges of the imaging device 11 and radar device 12 partially overlap with each other.

The cruise control apparatus 10 receives the image data from the imaging device 11, the distance measurement data from the radar device 12, and a detected signal from various types of sensors mounted to the vehicle, including a yaw rate sensor 13 for detecting the angular velocity (hereinafter, referred to as "yaw rate") of the vehicle turning, and a vehicle speed sensor 14 for detecting the vehicle speed. Also provided are a steering angle sensor 15 for detecting the steering angle and an ACC switch 16 operated by a driver to select a vehicle-following control mode. The vehicle further includes a direction indicator 17 for allowing the direction in which the vehicle is moving to be indicated outside the vehicle. The direction indicator 17 includes an operating lever that is manipulated by a driver into a left-direction indicator position, neutral position, or right-direction indicator position, and outputs an operation signal corresponding to the position of the operating lever to the cruise control apparatus 10.

The course prediction section 20 is a calculation unit that predicts a future course of the own vehicle. The course prediction section 20 includes a stationary object information acquisition unit 23, white line information acquisition unit 24, other vehicle's trajectory acquisition section 25, a radius of curvature estimation unit 26, a predicted course computation unit 21, and a cancellation determination section 27. The course prediction section 20 predicts the course of the own vehicle, based on the trajectory of the preceding vehicle traveling ahead of the own vehicle.

The stationary object information acquisition unit 23 calculates, based on the distance measurement data from the radar device 12, information on the position of a stationary roadside object (for example, a guardrail or a wall) that is present along the road on which the own vehicle is traveling, and outputs the calculated information to the predicted course computation unit 21 as stationary object information. The white line information acquisition unit 24 calculates information on a road separation line (white line) contained in the image captured by the imaging device 11, based on the image data from the imaging device 11, and outputs the calculated information to the predicted course computation unit 21 as white line information. Specifically, the method of calculating the white line information may involve extracting edge points, which are candidates for a white line, from the image data, based on, for example, a rate of change in luminance in a horizontal direction of the image, sequentially storing the extracted edge points on a frame-by-frame basis, and calculating white line information, based on the record of the stored edge points of the white line.

The other vehicle's trajectory acquisition section 25 calculates, based on the distance measurement data from the radar device 12 (information on the distance between and lateral position of the own vehicle and the preceding vehicle), cyclically calculates the preceding vehicle position, which is the position of the preceding vehicle (a set of coordinates indicating a point passed by the preceding vehicle), and stores the calculated preceding vehicle position chronologically. In addition, the other vehicle's trajectory acquisition section 25 calculates the trajectory of the preceding vehicle, based on the time-series data on the stored preceding vehicle positions, and outputs the calculated trajectory to the predicted course computation unit 21 as other vehicle's trajectory information. It should be noted that the other vehicle's trajectory acquisition section 25 may calculate information on the trajectory of a vehicle traveling on a lane adjacent to the own vehicle other than a vehicle traveling on the same lane as the own vehicle among preceding vehicles, and this information may be used for predicting the course of the own vehicle. The radius of curvature estimation unit 26 calculates the radius of curvature of the road on which the own vehicle is traveling (hereinafter, referred to as "estimated R"), based on the yaw angle detected by the yaw rate sensor 13 and the vehicle speed detected by the vehicle speed sensor 14. The estimated R may be calculated using image data, or may be calculated based on the steering angle detected by the steering angle sensor 15 and the vehicle speed detected by the vehicle speed sensor 14.

The predicted course computation unit 21 receives stationary object information from the stationary object information acquisition unit 23, white line information from the white line information acquisition unit 24, and other vehicle's trajectory information from the other vehicle's trajectory acquisition section 25. The predicted course computation unit 21 combines these pieces of input information, to calculate a predicted course RA, which is a predicted value of a future course of the own vehicle. It should be noted that the predicted course computation unit 21 can predict the course of the own vehicle without using the yaw rate of the own vehicle.

FIGS. 2A-2D schematically illustrate a procedure for computing a predicted course RA at the predicted course computation unit 21. FIG. 2A illustrates a plurality of stationary object detected points Pa, which are the results of the radar device 12 recognizing a solid obstacle which is a stationary roadside object (for example, a guardrail). FIG. 2B illustrates white line information Pb, which is the result of the imaging device 11 recognizing a white line. FIG. 2C illustrates a record of a plurality of vehicle detected points Pc, which are the results of the radar device 12 recognizing a preceding vehicles M2. Additionally, FIG. 2C illustrates two different preceding vehicles: a preceding vehicle traveling on the same lane as the own vehicle M1; and a preceding vehicle traveling on a lane adjacent to the own vehicle M1. FIG. 2D illustrates a predicted course RA that has been calculated using the stationary object detected points Pa, white line information Pb, and vehicle detected points Pc.

The predicted course computation unit 21 first compares the trajectory of a preceding vehicle M2, which is calculated from vehicle detected points Pc, with a white line and a solid obstacle. The predicted course computation unit 21 excludes (cancels) the trajectory of a preceding vehicle M2 when the trajectory does not conform to the shapes of the white line and solid obstacle. Then, if there is only one unexcluded trajectory of a preceding vehicle M2, the predicted course computation unit 21 uses that unexcluded trajectory in calculating a predicted course RA by weighting and averaging the trajectory of the preceding vehicle M2 and the white line information Pb. If there are a plurality of unexcluded trajectories of the preceding vehicle M2, the predicted course computation unit 21 calculates the predicted course RA by weighting and averaging the trajectory of preceding vehicles M2 and the white line information Pb, using an average of the unexcluded trajectories, to calculate the predicted course RA. The predicted course computation unit 21 corresponds to "the course calculation means".

Using a predicted course RA of the own vehicle M1 that has been inputted from the course prediction section 20, the followed vehicle setting unit 35 sets a preceding vehicle M2 present on the predicted course as a followed vehicle among preceding vehicles M2 traveling ahead of the own vehicle M1. The control target value computation unit 36 calculates a control target value which is used for maintaining, by controlling the travel speed of the own vehicle M, a following distance between the followed vehicle which has been set by the followed vehicle setting unit 35 and the own vehicle M1. The control target value computation unit 36 calculates a control target value for maintaining a predetermined target distance between the followed vehicle and the own vehicle. Specifically, the control target value computation unit 36 calculates, for example, a target output of an engine in the own vehicle or a required braking force, and outputs these to an engine electronic control unit (engine ECU 41). In the present embodiment, the cruise control apparatus 10 outputs a control signal to the engine ECU 41, and the engine ECU 41 outputs the control signal to a brake electronic control unit (brake ECU 42). Alternatively, the cruise control apparatus 10 may output the control signal to each of the engine ECU 41 and brake ECU 42.

Description will now be given of the calculation of the trajectory of the preceding vehicle M2, performed by the cruise control apparatus 10 according to the present embodiment. The other vehicle's trajectory acquisition section 25 of the present embodiment includes a preceding vehicle position storage unit 25a, a trajectory computation unit 25b, and a preceding vehicle position update unit 25c.

The preceding vehicle position storage unit 25a calculates the preceding vehicle position cyclically, based on the distance measurement data from the radar device 12, and stores the calculated preceding vehicle position chronologically in a predetermined storage area (storage device). In the present embodiment, vehicle detected points Pc are averaged for each of predetermined distance intervals, and an average value at each distance interval is set as a value of the preceding vehicle position Pd. FIG. 3 illustrates the preceding vehicle positions Pd and the trajectory RT of the preceding vehicle M2 traveling ahead of the own vehicle M1. In the present embodiment, as illustrated in FIG. 3, the region ahead of the own vehicle M1 is divided into a plurality of sections at intervals of 10 meters, for example, and the preceding vehicle position Pd is calculated for each of the sections. For example, in FIG. 3, an area ahead of the own vehicle M1 is divided into sections K1-K5. In this case, the preceding vehicle position storage unit 25a averages the vehicle detected points Pc in each of the sections K1-K5, to calculate the preceding vehicle position Pd. Then, the preceding vehicle position storage unit 25a chronologically stores the calculated preceding vehicle position Pd of each section. The preceding vehicle position storage unit 25a corresponds to "the position storage means".

The trajectory computation unit 25b reads out the time-series data on the preceding vehicle position Pd from the preceding vehicle position storage unit 25a. In addition, the trajectory computation unit 25b determines a straight line that represents the trajectory of a vehicle from the read out preceding vehicle position Pd, and uses the straight line as the trajectory RT of the preceding vehicle M2. In the present embodiment, as illustrated in FIG. 3, the preceding vehicle positions Pd of adjacent sections are joined by, for example, a straight line, and the trajectory generated by joining the straight line is used as the trajectory RT of the preceding vehicle M2.

The preceding vehicle position update unit 25c updates, as the previous value, each value of the preceding vehicle positions Pd, chronologically stored in the preceding vehicle position storage section 25 every time the trajectory RT of the preceding vehicle M2 is calculated. Specifically, the preceding vehicle position update unit 25c receives the speed of the own vehicle M1 detected by the vehicle speed sensor 14 and the yaw rate of the own vehicle M1 detected by the yaw rate sensor 13. The preceding vehicle position update unit 25c performs coordinate transformation of the preceding vehicle positions Pd chronologically stored in the preceding vehicle position storage unit 25a, based on the vehicle speed and yaw rate. The values of the preceding vehicle positions after the coordinate transformation are each updated as the previous value. The values after the update are each stored in the preceding vehicle position storage unit 25a as the previous value on a time-series basis.

Figure 4:
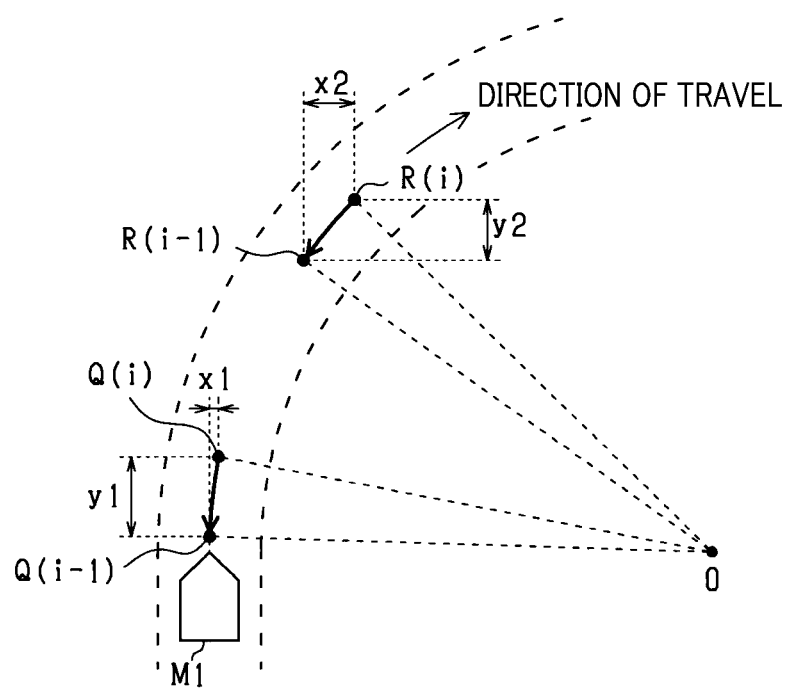
FIG. 4 illustrates a process of updating the preceding vehicle positions.

Referring to FIG. 4, a procedure for updating the preceding vehicle position Pd through the coordinate transformation will be described. FIG. 4 illustrates two points, position Q (i) and position R (i), which each are the preceding vehicle position Pd before the update. The preceding vehicle position update unit 25c performs coordinate transformation of the position Q (i) and the position R (i) using both a rotation matrix calculated with the virtual center O used as the origin and the estimated R that has been calculated based on the speed and yaw rate of the own vehicle M1. Each value of a position Q (i−1) and a position R (i−1), which have been subjected to the coordinate transformation, is updated as the previous value of the preceding vehicle position Pd. When a straight line joining the virtual center O and the own vehicle M1 is the X-axis and a straight line orthogonal to the X-axis is the Y-axis, the position Q (i) approaches the own vehicle M1 in the X axial direction by x1, and in the Y axial direction by y1 as a result of the coordinate transformation. In addition, the position R (i) approaches the own vehicle M1 in the X axial direction by x2 and in the Y axial direction by y2 as a result of the coordinate transformation. The position Q (i−1) and position R (i−1), which are the preceding vehicle positions Pd subjected to the update, together with the preceding vehicle positions Pd calculated based on newly obtained vehicle detected points Pc, are used to compute the trajectory RT in the next computation cycle. The preceding vehicle position update unit 25c corresponds to "the position update means".

During actual driving, a driver of each vehicle may change the course, possibly resulting in a situation inappropriate to the calculation of the trajectory RT of the preceding vehicle M2. When the trajectory RT of the preceding vehicle M2 is calculated using the preceding vehicle positions Pd obtained in the inappropriate situation and the course of the own vehicle M1 is predicted in such a case, the prediction may fail to provide a highly accurate result, resulting in low controllability of driving assistance.

The present embodiment determines whether either the own vehicle M1 or the preceding vehicle M2 is in a situation where the own vehicle M1 or the preceding vehicle M2 is likely to depart from the current course. If it has been determined that either the own vehicle M1 or the preceding vehicle M2 is in a situation where the own vehicle M1 or the preceding vehicle M2 is likely to depart from the current course, the preceding vehicle positions Pd stored in the preceding vehicle position storage unit 25a are canceled.

As specifically illustrated in FIG. 1, the cruise control apparatus 10 of the present embodiment includes a cancellation determination section 27, which serves as a means for canceling the preceding vehicle positions Pd stored in the preceding vehicle position storage unit 25a. The cancellation determination section 27 includes a course departure determination unit 27a and a sensor accuracy determination unit 27b.

The course departure determination unit 27a determines whether either the own vehicle M1 or the preceding vehicle M2 is in a situation where the own vehicle M1 or the preceding vehicle M2 is likely to turn right or left, based on the speed of the own vehicle M1 and the preceding vehicle M2. Specifically, it is determined whether the preceding vehicle M2 is traveling at low speed (hereinafter, referred to as "first estimation condition") or the own vehicle M1 is traveling at low speed (hereinafter, referred to as "second estimation condition"). The reason for employing the estimation conditions in the determination method is that when the preceding vehicle M2 or the own vehicle M1 caused to follow the preceding vehicle M2 is traveling at low speed, the vehicles may be preparing to turn right or left.

As used herein, "traveling at low speed" is a concept including the fact that a vehicle has decelerated, and the fact that a vehicle is traveling at low speed. In the present embodiment, the first estimation condition is determined based on the distance measurement data from the radar device 12, and the second estimation condition is determined based on a value detected by the vehicle speed sensor 14. The course departure determination unit 27a outputs a cancellation signal to the other vehicle's trajectory acquisition section 25 upon determining that at least one of the first estimation condition and second estimation condition has been met.

The sensor accuracy determination unit 27b determines whether the positions of the own vehicle M1 and the preceding vehicle M2 satisfy a relationship such that the detection accuracy of the radar device 12 will decrease, based on the distance measurement data from the radar device 12. Specifically, it is determined whether at least any of the following estimation conditions is met. One estimation condition is that the following distance between the own vehicle M1 and the preceding vehicle M2 is extremely large (larger than a predetermined distance) (hereinafter, referred to as "third estimation condition"). Another estimation condition is that the preceding vehicle M2 has deviated from a front position of the own vehicle M1 and is now present in a wide-angle area of a sensor (hereinafter, referred to as "forth estimation condition"). Another estimation condition is that the relative velocity between the preceding vehicle M2 and the own vehicle M1 is large (hereinafter, referred to as "fifth estimation condition"). The sensor accuracy determination unit 27b outputs a cancellation signal to the other vehicle's trajectory acquisition section 25 when at least any of these estimation conditions is met. The cancellation determination section 27 corresponds to "the cancellation means".

The other vehicle's trajectory acquisition section 25 cancels the preceding vehicle positions Pd stored in the preceding vehicle position storage unit 25a upon receipt of the cancellation signal from the cancellation determination section 27 (at least one of the course departure determination unit 27a and the sensor accuracy determination unit 27b). In this case, when a plurality of preceding vehicles M2 have been recognized, all of the preceding vehicle positions Pd stored chronologically in the preceding vehicle position storage unit 25a may be canceled; alternatively, only the preceding vehicle position Pd of a preceding vehicle M2 that is likely to depart from the current course may be canceled. The preceding vehicle position Pd may be cancelled by, for example, deleting the information thereon, or prohibiting the use thereof.

A process for calculating the trajectory RT of the preceding vehicle M2, performed by the cruise control apparatus 10 of the present embodiment, will now be described with reference to the flow diagram of FIG. 5. This process is performed by the other vehicle's trajectory acquisition section 25 and the cancellation determination section 27. The ECU of the cruise control apparatus 10 performs the process cyclically while a vehicle is traveling and the ACC switch 16 is on.

Figure 5:
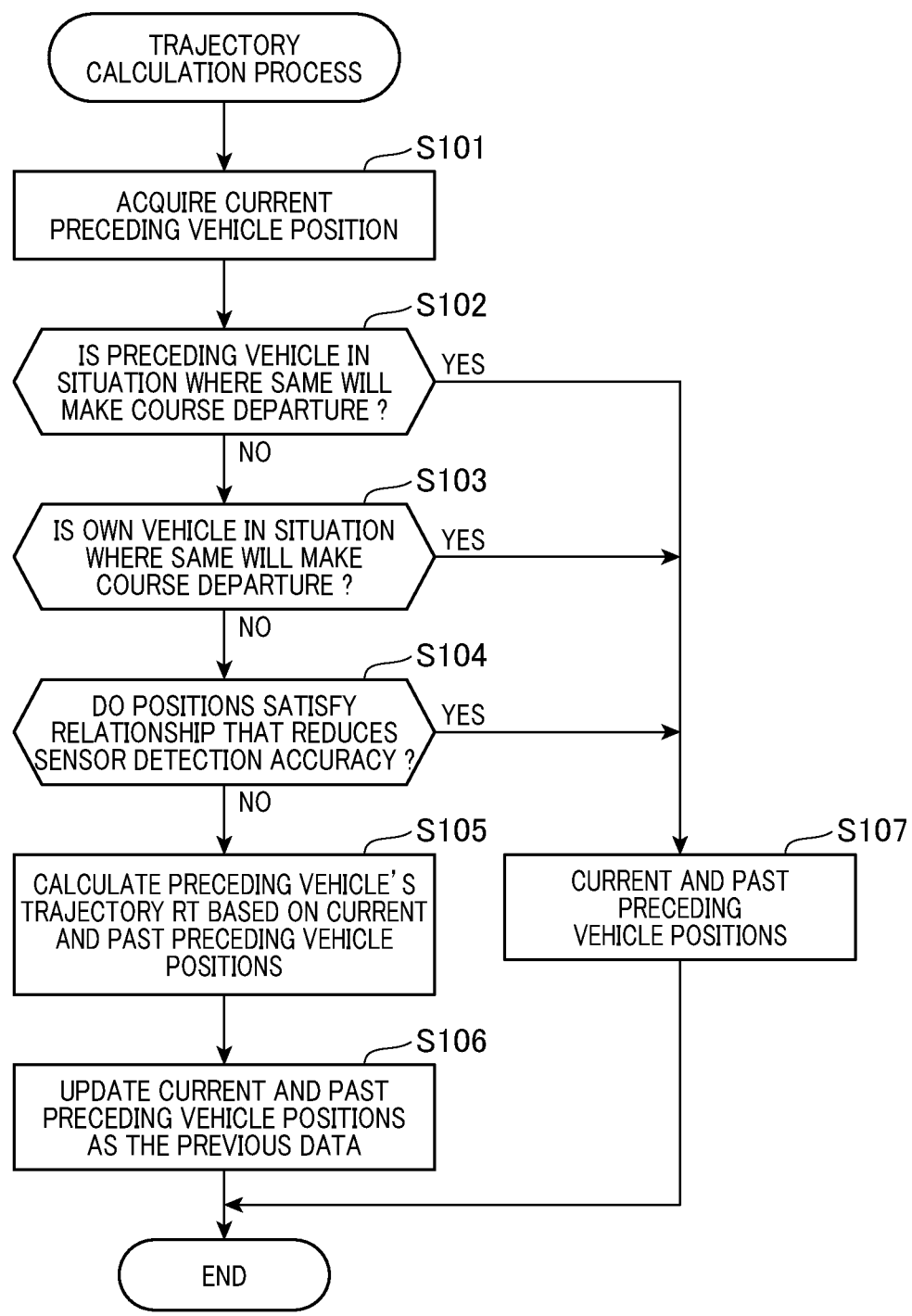
FIG. 5 is a flow diagram of a procedure for calculating the trajectory of the preceding vehicle.

FIG. 5 is a flow diagram illustrating a procedure for calculating the trajectory of the preceding vehicle M2. As illustrated in FIG. 5, at step S101, the cruise control apparatus 10 acquires the preceding vehicle position Pd that has been calculated in a current computation cycle. Next, at step S102, the cruise control apparatus 10 determines whether the preceding vehicle M2 is in a situation where the preceding vehicle M2 is likely to depart from the current course (course departure of the preceding vehicle M2). The condition for this determination is that the preceding vehicle M2 is traveling at low speed (whether the first estimation condition is met). If it has been determined that the preceding vehicle M2 is in a situation where the preceding vehicle M2 is likely to depart from the current course (YES at step S102), the cruise control apparatus 10 causes the process to proceed to step S107, and cancels the current and past preceding vehicle positions Pd stored chronologically in the preceding vehicle position storage unit 25a. When the preceding vehicle M2 has been decelerating or traveling at low speed (for example, several km/h to less than 20 km/h) for a predetermined period of time (for example, for a few seconds), the cruise control apparatus 10 determines that the preceding vehicle M2 is traveling at low speed, and that the preceding vehicle M2 is in a situation where the preceding vehicle M2 is likely to depart from the current course.

If it has been determined that the preceding vehicle M2 is not in a situation where the preceding vehicle M2 is likely to depart from the current course (NO at step S102), the cruise control apparatus 10 causes the process to proceed to step S103, and determines whether the own vehicle M1 is in a situation where the own vehicle M1 is likely to depart from the current course (course departure of the own vehicle M1). The condition for this determination is that the own vehicle M1 is traveling at low speed (i.e., the second estimation condition is met). If it has been determined that the own vehicle M1 is in a situation where the own vehicle M1 is likely to depart from the current course (YES at step S103), the cruise control apparatus 10 causes the process to proceed to step S107, and cancels the current and past preceding vehicle positions Pd stored chronologically in the preceding vehicle position storage unit 25a. When the preceding vehicle M1 has been decelerating or traveling at low speed for a predetermined period of time (for example, for a few seconds), the cruise control apparatus 10 determines that the preceding vehicle M1 is traveling at low speed, and that the own vehicle M1 is in a situation where the own vehicle M1 is likely to depart from the current course.

If it has been determined that the own vehicle M1 is not in a situation where the own vehicle M1 is likely to depart from the current course (NO at step S103), the cruise control apparatus 10 causes the process to proceed to step S104, and determines whether the positions of the own vehicle M1 and the preceding vehicle M2 satisfy a relationship such that the detection accuracy of the radar device 12 will decrease. The condition for this determination is any of the following. The first condition is that the following distance between the own vehicle M1 and the preceding vehicle M2 is extremely large (i.e., the third estimation condition is met). The second condition is that the preceding vehicle M2 has deviated from the front position of the own vehicle M1 and is now present in a wide-angle area of a sensor (i.e., the forth estimation condition is met). The third condition is that the relative velocity between the preceding vehicle M2 and the own vehicle M1 is large (i.e., the fifth estimation condition is met). If it has been determined that the positions of the own vehicle M1 and the preceding vehicle M2 satisfy the relationship such that the detection accuracy of the radar device 12 will decrease (YES at step S104), the cruise control apparatus 10 causes the process to proceed to step S107, and cancels the current and past preceding vehicle positions Pd stored chronologically in the preceding vehicle position storage unit 25a.

If it has been determined that the positions of the own vehicle M1 and the preceding vehicle M2 do not satisfy the relationship such that the detection accuracy of the radar device 12 will decrease (NO at step S104), that is, if the outcomes of steps S102-S104 are negative, the cruise control apparatus 10 causes the process to proceed to step S105. The cruise control apparatus 10 enables the current and past preceding vehicle positions Pd stored chronologically in the preceding vehicle position storage unit 25a at step S105, and calculates the trajectory RT of the preceding vehicle M2, based on the time-series data on the preceding vehicle positions Pd. Next, at step S106, the cruise control apparatus 10 performs coordinate transformation of the current and past preceding vehicle positions Pd, using a rotation matrix, and updates each value of the preceding vehicle positions Pd subjected to the coordinate transformation as the previous value.

According to the present embodiment described above in detail, the following favorable effects can be obtained.

The cruise control apparatus 10 of the present embodiment is configured to cancel a preceding vehicle position Pd, which is information indicating the trajectory RT of the preceding vehicle M2 when it has been determined that either the own vehicle M1 or the preceding vehicle M2 is in a situation where the own vehicle M1 or the preceding vehicle M2 is likely to depart from the current course. When the course of the own vehicle M1 is predicted using the data obtained in a situation where the own vehicle M1 or the preceding vehicle M2 has departed from the current course, that is, has not moved along the lane or the road, accuracy in the prediction may decrease. According to the present embodiment, the above-described cruise control apparatus 10 can prevent accuracy in predicting the course of the own vehicle M1 from decreasing.

Specifically, the cruise control apparatus 10 of the present embodiment determines whether either the own vehicle M1 or the preceding vehicle M2 is in a situation where the own vehicle M1 or the preceding vehicle M2 is likely to turn right or left. The cruise control apparatus 10 is configured to cancel the preceding vehicle positions Pd stored chronologically in the preceding vehicle position storage unit 25a when it has been determined that either the own vehicle M1 or the preceding vehicle M2 is in a situation where the own vehicle M1 or the preceding vehicle M2 is likely to turn right or left. If the course of the own vehicle M1 is predicted using the preceding vehicle positions Pd obtained after the right or left turn, it is highly likely that accuracy in predicting the course of the own vehicle M1 will decrease. In view of this, the above-configured cruise control apparatus 10 according to the present embodiment prevents accuracy in predicting the course of the own vehicle M1 from decreasing when the preceding vehicle M2 or the own vehicle M1 makes right or left turn.

When either the own vehicle M1 or the preceding vehicle M2 is traveling at low speed, the own vehicle M1 or the preceding vehicle M2 may be preparing to turn right or left. With this point in view, the cruise control apparatus 10 according to the present embodiment is configured to cancel the current and past preceding vehicle positions Pd when it has been determined that either the own vehicle M1 or the preceding vehicle M2 is traveling at low speed. This configuration is suitable for preventing the course of the own vehicle M1 from being predicted using data that might cause degradation in the prediction accuracy.

When, for example, the following distance between the own vehicle M1 and the preceding vehicle M2 is extremely large, the preceding vehicle M2 is present in the wide-angle area of the sensor, and the relative velocity between the own vehicle M1 and the preceding vehicle M2 is high, the positions of the own vehicle M1 and the preceding vehicle M2 satisfy a relationship such that the detection accuracy of the radar device 12 will decrease. In such situations, he cruise control apparatus 10 of the present embodiment cancels the preceding vehicle positions Pd stored in the preceding vehicle position storage unit 25a. This configuration prevents accuracy in predicting the trajectory of the own vehicle M1 from decreasing, and is thus desirable for performing a vehicle-following control with high accuracy.

The cruise control apparatus 10 according to this embodiment performs coordinate transformation of the preceding vehicle positions Pd on a time-series basis, based on the estimated R calculated from the speed and yaw rate of the own vehicle M1. Each value of the preceding vehicle positions after the coordinate transformation is updated as the previous value. With this configuration, the position of the preceding vehicle M2 can be determined relative to (with reference to) the position of the own vehicle M1 at a point in time during traveling of the own vehicle M1. Thus when the own vehicle M1 is turning, the trajectory RT of the preceding vehicle M2 can be calculated more accurately, thus allowing the trajectory of the own vehicle M1 to be predicted more appropriately.

Other Possible Embodiments

This disclosure is not limited to the above embodiment, and may be implemented as follows.

In the above embodiment, the predicted course computation unit 21 receives stationary object information, white line information, and other vehicle's trajectory information, and calculates the predicted course RA using these pieces of input information. The predicted course RA may be calculated using, for example, other vehicle's trajectory information only. The predicted course RA may be calculated based on the other vehicle's trajectory information and the stationary object information. The predicted course RA may also be calculated based on the other vehicle's trajectory information and the white line information.

In the above embodiment, the determination of whether either the own vehicle M1 or the preceding vehicle M2 is in a situation where the own vehicle M1 or the preceding vehicle M2 is likely to turn right or left is based on whether either the own vehicle M1 or the preceding vehicle M2 is traveling at low speed. Other than a vehicle speed, other conditions may be used in determining whether either the own vehicle M1 or the preceding vehicle M2 is in a situation where the own vehicle M1 or the preceding vehicle M2 is likely to turn right or left. For example, the fact that lighting of a brake lamp of the preceding vehicle M2 has been recognized, or lighting of a direction indicator of the preceding vehicle M2 has been recognized may be set as the condition for the above determination, and the determination may be based on whether the condition is met. Alternatively, the fact that in the own vehicle M1 a brake has been operated for deceleration, or the fact that in the own vehicle M1 the direction indicator 17 has been operated may be set as the condition for the determination, and the determination may be based on whether the condition is met. Alternatively, combination of the condition that the own vehicle M1 or the preceding vehicle M2 is traveling at low speed and the conditions described here may be used in determining whether either the own vehicle M1 or the preceding vehicle M2 is in a situation where the own vehicle M1 or the preceding vehicle M2 is likely to turn right or left. If the fact that the brake lamp of the preceding vehicle M2 has been lit, or the fact that the direction indicator of the preceding vehicle M2 has been lit are used as the condition for the determination, it is preferable to use the data on an image captured by the imaging device 11.

In the above embodiment, the current and past preceding vehicle positions Pd may be canceled when it has been determined that either the own vehicle M1 or the preceding vehicle M2 is in a situation where the own vehicle M1 or the preceding vehicle M2 is likely to make a line change. This is because the lane change may lead to the preceding vehicle M2 deviating from the front position of the own vehicle M1 (entering the wide-angle area of the sensor), resulting in low accuracy in the detection. Determination of whether either the own vehicle M1 or the preceding vehicle M2 is in a situation where the own vehicle M1 or the preceding vehicle M2 is likely to make a lane change may be based on, for example, whether lighting of the direction indicator of the preceding vehicle M2, has been lit, or whether the direction indicator 17 of the own vehicle M1 has been operated.

In order for the obtained preceding vehicle position Pd to be canceled, other configurations are possible instead of deleting or prohibiting the use of the preceding vehicle position Pd stored in the preceding vehicle position storage unit 25a. For example, a possible configuration involves deleting the trajectory RT calculated using the preceding vehicle positions Pd stored in the preceding vehicle position storage unit 25a. Another possible configuration involves prohibiting the use of the trajectory RT calculated using the preceding vehicle positions Pd. Another possible configuration involves deleting or prohibiting the use of the vehicle detected points Pc to be used for the calculation of the preceding vehicle position Pd.

In the above embodiment, vehicle detected points Pc are averaged for each predetermined section, and the average of the vehicle detected points Pc is set as the preceding vehicle position Pd, and the preceding vehicle positions Pd of the adjacent sections are joined by a straight line, to form the trajectory RT of the preceding vehicle M2. The preceding vehicle position Pd is not limited to the average of the vehicle detected points Pc of each predetermined section. For example, the preceding vehicle position Pd may be used as the vehicle detected points Pc. In addition, the trajectory RT of the preceding vehicle M2 is not limited to the straight line joining the preceding vehicle positions Pd of the adjacent sections. For example, the vehicle detected points Pc may be averaged to calculate the trajectory RT.

In the above embodiment, the imaging device 11 and the radar device 12 are provided as the object detection means, but the embodiment is not limited to this configuration, and for example, a sonar for detecting an object using ultrasonic waves as transmitting waves may be applied to the configuration. In addition, the technique of this disclosure may be applied to a vehicle in which the imaging device 11 is not mounted.

In the above embodiment, the technique is applied to a vehicle-following control for enabling the own vehicle to follow the preceding vehicle M2 that travels on the same lane as the own vehicle M1. The technique of this disclosure may be applied to a course prediction of the own vehicle M1 for preventing a collision between the own vehicle M1 and another vehicle. In addition, this disclosure may be implemented in various types of modes such as a program used to cause a computer to execute each function (each means) that constitutes the above cruise control apparatus 10, a medium storing this program, and a vehicle cruise control method.

REFERENCE SIGNS LIST

10 . . . Cruise control apparatus, 11 . . . Imaging device, 12 . . . Radar device, 13 . . . Yaw rate sensor, 20 . . . Course prediction unit, 21 . . . Predicted course computation unit, 23 . . . Stationary object information acquisition unit, 24 . . . White line information acquisition unit, 25 . . . Other vehicle's trajectory acquisition section, 26 . . . Radius of curvature estimation unit, 27 . . . Cancellation determination section, 35 . . . Followed vehicle setting unit, 36 . . . Control target value computation unit, 41 . . . Engine ECU, 42 . . . Brake ECU

The invention claimed is:

1. A vehicle cruise control apparatus for controlling traveling of an own vehicle, based on a predicted course, which is a future course of the own vehicle, the apparatus comprising:

at least one electronic control unit including a processor and memory, the electronic control unit configured to:

chronologically store on the memory a preceding vehicle position, which is a position of a preceding vehicle traveling ahead of the own vehicle, the preceding vehicle being detected using at least one sensor;

calculate the predicted course, based on a trajectory of the preceding vehicle position stored in the memory;

update, as the previous value calculated in the previous calculation cycle of a trajectory of the preceding vehicle position, each value of the preceding vehicle positions stored in the memory every time a trajectory of the preceding vehicle is calculated;

calculate a radius of curvature of a road on which the own vehicle is traveling, based on a speed and a yaw rate of the own vehicle;

perform, using a rotation matrix, coordinate transformation of the preceding vehicle position stored in the memory, based on the calculated radius of curvature;

update, as the previous value, the value of the preceding vehicle position after the coordinate transformation;

set the preceding vehicle present on the predicted course as a followed vehicle among preceding vehicles traveling ahead of the own vehicle; and control at least one of an engine control unit and a brake control unit by outputting a control signal to keep a distance between the own vehicle and the set followed vehicle.

2. The vehicle cruise control apparatus according to claim 1, wherein the electronic control unit determines whether either the own vehicle or the preceding vehicle is in a situation where the own vehicle or the preceding vehicle is likely to depart from the current course, and cancels the preceding vehicle position stored in the storage device in response to determining that either the own vehicle or the preceding vehicle is in a situation where the own vehicle or the preceding vehicle is likely to depart from the current course, and updates, as the previous value, each preceding vehicle position stored in the storage device every time a trajectory of the preceding vehicle is calculated in response to determining that neither the own vehicle nor the preceding vehicle will depart from the current course, and the preceding vehicle position stored in the storage device is enabled.

3. The vehicle cruise control apparatus according to claim 2, wherein the electronic control unit determines that either the own vehicle or the preceding vehicle is in a situation where the own vehicle or the preceding vehicle is likely to depart from the current course in response to either the own vehicle or the preceding vehicle being in a situation where the own vehicle or the preceding vehicle is likely to make a right turn, left turn, or lane change.

4. The vehicle cruise control apparatus according to claim 2, wherein the electronic control unit determines that either the own vehicle or the preceding vehicle is in a situation where the own vehicle or the preceding vehicle is likely to depart from the current course in response to either the own vehicle or the preceding vehicle traveling at low speed.

5. The vehicle cruise control apparatus according to claim 2, wherein the own vehicle includes a following distance sensor for detecting a following distance between the own vehicle and the preceding vehicle by transmitting and receiving search waves, the memory stores the preceding vehicle position calculated based on a value detected by the following distance sensor, and the electronic control unit determines whether positions of the own vehicle and the preceding vehicle satisfy a relationship such that detection accuracy of the following distance sensor will decrease, and cancelling the preceding vehicle position stored on the memory in response to determining that the positions of the own vehicle and the preceding vehicle satisfy the relationship.

6. The vehicle cruise control apparatus according to claim 5, wherein the electronic control unit determines that positions of the own vehicle and the preceding vehicle satisfy the relationship such that the detection accuracy of the following distance sensor will decrease in response to the following distance between the own vehicle and the preceding vehicle being larger than a predetermined distance.

7. The vehicle cruise control apparatus according to claim 5, wherein in response to the preceding vehicle deviating from a front position of the own vehicle and is now present in a wide-angle area of the following distance sensor, the electronic control unit determines that positions of the own vehicle and the preceding vehicle satisfy the relationship such that the detection accuracy of the following distance sensor will decrease.

8. The vehicle cruise control apparatus according to claim 5, wherein in response to a relative velocity between the preceding vehicle and the own vehicle being large, the electronic control unit determines that positions of the own vehicle and the preceding vehicle satisfy the relationship such that the detection accuracy of the following distance sensor will decrease.

9. A vehicle cruise control method for controlling traveling of an own vehicle, based on a predicted course, which is a future course of the own vehicle, the method including instructions which executed by a vehicle cruise control apparatus, the instruction comprising steps of:

chronologically storing in a predetermined storage device a preceding vehicle position, which is a position of a preceding vehicle traveling ahead of the own vehicle, the preceding vehicle is detected using at least one sensor;

calculating the predicted course, based on a trajectory of the preceding vehicle position stored in the storage device;

updating, as the previous value calculated in the previous calculation cycle of a trajectory of the preceding vehicle position, each value of the preceding vehicle positions stored in the storage device every time a trajectory of the preceding vehicle is calculated;

calculating a radius of curvature of a road on which the own vehicle is traveling, based on a speed and a yaw rate of the own vehicle;

performing, using a rotation matrix, coordinate transformation of the preceding vehicle position stored in the storage device, based on the calculated radius of curvature;

updating, as the previous value, the value of the preceding vehicle position after the coordinate transformation;

setting the preceding vehicle present on the predicted course as a followed vehicle among preceding vehicles traveling ahead of the own vehicle; and controlling at least one of an engine control unit and a brake control unit by outputting a control signal to keep a distance between the own vehicle and the set followed vehicle.

10. A vehicle cruise control apparatus for controlling traveling of an own vehicle, based on a predicted course, which is a future course of the own vehicle, the apparatus comprising:

a memory;

a processor communicable to the memory; and a set of computer-executable instructions stored on the memory that cause the processor to implement:

chronologically storing on the memory a preceding vehicle position, which is a position of a preceding vehicle traveling ahead of the own vehicle, the preceding vehicle is detected using at least one sensor;

calculating the predicted course, based on a trajectory of the preceding vehicle position stored on the memory;

updating, as the previous value calculated in the previous calculation cycle of a trajectory of the preceding vehicle position, each value of the preceding vehicle positions stored in the storage device every time a trajectory of the preceding vehicle is calculated;

calculating a radius of curvature of a road on which the own vehicle is traveling, based on a speed and a yaw rate of the own vehicle;

performing, using a rotation matrix, coordinate transformation of the preceding vehicle position stored in the storage device, based on the calculated radius of curvature;

updating, as the previous value, the value of the preceding vehicle position after the coordinate transformation;

setting the preceding vehicle present on the predicted course as a followed vehicle among preceding vehicles traveling ahead of the own vehicle; and controlling at least one of an engine control unit and a brake control unit by outputting a control signal to keep a distance between the own vehicle and the set followed vehicle.

* * * * *